(12) United States Patent
Kumar et al.

(10) Patent No.: US 11,099,768 B2
(45) Date of Patent: Aug. 24, 2021

(54) TRANSITIONING FROM AN ORIGINAL DEVICE TO A NEW DEVICE WITHIN A DATA STORAGE ARRAY

(71) Applicant: EMC IP Holding Company LLC, Hopkinton, MA (US)

(72) Inventors: Kundan Kumar, Bangalore (IN); Kurumurthy Gokam, Bangalore (IN); Md Haris Iqbal, Bangalore (IN); Remesh Parakunnath, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/747,811

(22) Filed: Jan. 21, 2020

(65) Prior Publication Data

US 2021/0223959 A1    Jul. 22, 2021

(51) Int. Cl.
  *G06F 13/00*    (2006.01)
  *G06F 3/06*     (2006.01)
  *G06F 13/42*    (2006.01)
  *G06F 13/16*    (2006.01)

(52) U.S. Cl.
  CPC .......... *G06F 3/065* (2013.01); *G06F 3/0604* (2013.01); *G06F 3/0683* (2013.01); *G06F 13/1668* (2013.01); *G06F 13/4282* (2013.01); *G06F 2213/0032* (2013.01); *G06F 2213/0036* (2013.01)

(58) Field of Classification Search
  CPC ...... G06F 3/065; G06F 3/0683; G06F 3/0604; G06F 13/1668; G06F 13/4282; G06F 2213/0036; G06F 2213/0032
  See application file for complete search history.

(56) References Cited

U.S. PATENT DOCUMENTS

| | | | |
|---|---|---|---|
| 10,635,348 B2 | 4/2020 | Yang et al. | |
| 10,678,437 B2 | 6/2020 | Xu et al. | |
| 10,831,718 B1 | 11/2020 | Bono | |
| 10,853,250 B2 | 12/2020 | Xu et al. | |
| 10,860,483 B2 | 12/2020 | Fliess et al. | |
| 10,921,987 B1 | 2/2021 | Armangau et al. | |
| 10,936,489 B2 | 3/2021 | Han et al. | |
| 2020/0089433 A1* | 3/2020 | Koyama | G06F 3/0659 |
| 2020/0266878 A1* | 8/2020 | Takagi | H04L 45/46 |

* cited by examiner

*Primary Examiner* — Jing-Yih Shyu
(74) *Attorney, Agent, or Firm* — BainwoodHuang

(57) ABSTRACT

A technique provides transitioning from an original device to a new device within a data storage array. The technique involves initiating a copying activity within the data storage array, the copying activity copying data from the original device to the new device. The technique further involves, while the data is being copied from the original device to the new device, routing write requests that target logical storage which is currently supported by the original device to both the original device and the new device. The technique further involves, after the data has been copied from the original device to the new device, performing a configuration change which routes I/O requests that target the logical storage to the new device rather than the original device.

20 Claims, 6 Drawing Sheets

TRANSITIONING FROM AN ORIGINAL DEVICE TO A NEW DEVICE WITHIN A DATA STORAGE ARRAY

BACKGROUND

A conventional data storage system includes a set of storage processors and an array of storage devices. During operation, the set of storage processors stores host data into and retrieves host data from the array of storage devices on behalf of host input/output (I/O) requests from one or more host computers.

Some conventional data storage systems include different storage tiers that provide different response times. For example, a particular data storage system may include a fast tier of solid state drives (SSDs) and a slow tier of hard disk drives (HDDs). During operation, the set of storage processors may evict host data from the fast tier into the slow tier based on certain eviction criteria or policies. Similarly, the set of storage processors may promote host data from the slow tier into the fast tier based on certain promotion criteria or policies.

SUMMARY

It should be understood that there are deficiencies to the above-described conventional data storage systems. In particular, different storage tiers of the convention data storage systems may provide some ability for controlling access times to host data, but there is still no solution for upgrading storage devices to further improve access times.

Along these lines, suppose that the operator of a conventional data storage system wishes to improve response time when one or more host computers access the fastest storage tier. Perhaps the operator would prefer using Non-Volatile Memory Express (NVMe) drives in place of Serial Attached SCSI/Serial ATA solid state drives (SAS/SATA SSDs).

One approach to improving response time is for the operator to migrate from the existing data storage system to a faster data storage system which is equipped with the faster storage drives. However, this approach is burdensome and expensive since the operator needs to replace the entire existing data storage system.

Another approach to improving response time is for the operator to write and run a script on a host computer that transfers data from a slower storage device on the data storage system to a faster storage device on the data storage system. However, running the script on the host computer consumes resources such as processing cycles and memory on the host computer, network bandwidth between the host computer and the data storage system, and so on.

In contrast, improved techniques are directed to transitioning from original devices to new devices within data storage arrays by changing function pointers in the input/output (I/O) paths of the data storage arrays. Along these lines, some data storage arrays have the ability to replace function pointers in the I/O paths of the kernels. To transition from using an original device (e.g., a slower storage drive) to using a new device (e.g., a faster storage drive) in such a data storage array, the data storage array starts copying data from the original device to the new device. Additionally, while the data storage array copies the data from the original device to the new device, the I/O path is modified to use different function pointers to different functions. In particular, at a first time, the function pointer in the I/O path is modified to use a function that clones writes requests that target logical storage supported by the original device (i.e., to clone write requests to both the original device and the new device for consistency). At a second time after data storage array has copied all of the data from the original device to the new device, the function pointer in the particular I/O path is modified again to use a function that ensures that subsequent I/O requests targeting the logical storage go to the new device. Such techniques alleviate the need to replace an entire data storage system. Furthermore, such techniques can be performed in the background (e.g., transparently from host computers) rather than intrusively consume host computer resources and network bandwidth.

One embodiment is directed to a method of transitioning from an original device to a new device within a data storage array. The method includes initiating a copying activity within the data storage array, the copying activity copying data from the original device to the new device. The method further includes, while the data is being copied from the original device to the new device, routing write requests that target logical storage which is currently supported by the original device to both the original device and the new device. The method further includes, after the data has been copied from the original device to the new device, performing a configuration change which routes I/O requests that target the logical storage to the new device rather than the original device.

In some arrangements, the data storage array uses different I/O entry functions to access different storage devices. Additionally, the method further includes, prior to initiating the copying activity, processing I/O requests targeting the logical storage using a first I/O entry function that accesses the original device. Also, the method further includes, after the configuration change is performed, processing I/O requests targeting the logical storage using a second I/O entry function that accesses the new device rather than the first I/O entry function that accesses the original device.

In some arrangements, the data storage array executes a kernel which addresses the first I/O entry function via a first function pointer and addresses the second I/O entry function via a second function pointer. Additionally, the kernel manages access to the logical storage via an I/O path which initially includes the first function pointer when processing I/O requests targeting the logical storage using the first I/O entry function. Furthermore, performing the configuration change includes modifying the I/O path to use the second function pointer in place of the first function pointer. The kernel processes I/O requests targeting the logical storage using the second I/O entry function in response to modifying the I/O path to use the second function pointer.

In some arrangements, at least some of the requests originate from a set of hosts. Additionally, the copying activity and the configuration change are performed transparently from the perspective of the set of hosts.

In some arrangements, initiating the copying activity within the data storage array includes receiving a user command to transition from the original device to the new device, and in response to the user command, reading the data from the original device and writing the data to the new device.

In some arrangements, receiving the transition command includes obtaining, as the transition command, an IOCTL system call which includes:
 (i) a first identifier which identifies, as the storage device to transition from, the original device, and
 (ii) a second identifier which identifies, as the storage device to transition to, the new device.
Additionally, starting the background copy operation includes, in response to the IOCTL system call, starting a background copy operation that reads the data from the original device and writes the data to the new device. The background copy operation is transparent to a set of hosts that access the logical storage.

In some arrangements, the original device has a first series of sectors, and the new device has a second series of sectors which matches the first series of sectors. Additionally, reading the data from the original device and writing the data to the new device includes sequentially reading data from the first series of sectors of the original device and writing the data to the second series of sectors of the new device to preserve data sector locations.

In some arrangements, routing write requests that target logical storage which is currently supported by the original device to both the original device and the new device includes processing I/O requests using a third I/O entry function that accesses both the original device and the new device. The third I/O entry function is different from the first I/O entry function and the second I/O entry function.

In some arrangements, the data storage array executes a kernel which addresses the first I/O entry function via a first function pointer at, addresses the second I/O entry function via a second function pointer, and addresses the third I/O entry function via a third function pointer. Additionally, the kernel manages access to the logical storage via an I/O path which initially includes the first function pointer when processing I/O requests targeting the logical storage using the first I/O entry function. Furthermore, routing write requests that target logical storage which is currently supported by the original device to both the original device and the new device further includes, prior to processing I/O requests using the third I/O entry function, modifying the I/O path to use the third function pointer in place of the first function pointer. The kernel processes I/O requests targeting the logical storage using the third I/O entry function in response to modifying the I/O path to use the third function pointer.

In some arrangements, processing I/O requests using the third I/O entry function includes cloning (or duplicating) write operations targeting the logical storage to both the original device and the new device.

In some arrangements, the original device is a Serial Attached SCSI/Serial ATA solid state drive (SAS/SATA SSD). Additionally, processing I/O requests targeting the logical storage using the first I/O entry function that accesses the original device includes performing I/O operations on the SAS/SATA SSD in accordance with the Serial Attached SCSI/Serial ATA Solid State protocol.

In some arrangements, the new device is a Non-Volatile Memory Express (NVMe) drive. Additionally, processing I/O requests targeting the logical storage using the second I/O entry function that accesses the new device includes performing I/O operations on the NVMe drive in accordance with the Non-Volatile Memory Express protocol.

In some arrangements, the method further includes, prior to initiating the copying activity, adding the NVMe drive to the data storage array while I/O operations are performed on the SAS/SATA SSD. Accordingly, the copying activity and servicing host I/O requests maybe performed concurrently.

Another embodiment is directed to a data storage array. The data storage array includes a set of interfaces, memory, and control circuitry coupled to the set of interfaces and the memory. The memory stores instructions which, when carried out by the control circuitry, cause the control circuitry to:

(A) initiate a copying activity within the data storage array, the copying activity copying data from an original device to a new device,
(B) while the data is being copied from the original device to the new device, route write requests received through the set of interfaces that target logical storage which is currently supported by the original device to both the original device and the new device, and
(C) after the data has been copied from the original device to the new device, perform a configuration change which routes input/output (I/O) requests received through the set of interfaces that target the logical storage to the new device rather than the original device.

Yet another embodiment is directed to a computer program product having a non-transitory computer readable medium which stores a set of instructions to transition from an original device to a new device within a data storage array. The set of instructions, when carried out by computerized circuitry, causes the computerized circuitry to perform a method of:

(A) initiating a copying activity within the data storage array, the copying activity copying data from the original device to the new device;
(B) while the data is being copied from the original device to the new device, routing write requests that target logical storage which is currently supported by the original device to both the original device and the new device; and
(C) after the data has been copied from the original device to the new device, performing a configuration change which routes input/output (I/O) requests that target the logical storage to the new device rather than the original device.

It should be understood that, in the cloud context, at least some of the electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in transitioning from an original device to a new device within a data storage array by changing function pointers in an I/O path of the data storage array.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to transitioning from an original device to a new device within a data storage array by changing function pointers in the input/output (I/O) path of the data storage array. Along these lines, the data storage array has the ability to replace function pointers in the I/O path of the kernel. To transition from using the original device (e.g., a slower storage drive) to using the new device (e.g., a faster storage drive), the data storage array starts copying data from the original device to the new device. Furthermore, while the data storage array copies the data from the original device to the new device, the I/O path is modified to use a different function pointer to a different I/O function. In particular, the function pointer in the I/O path is changed to use a function that clones writes requests that target logical storage supported by the original device (i.e., so that each write request is routed to both the original device and the new device for consistency). After data storage array has copied all of the data from the original device to the new device, the function pointer in the particular I/O path is changed again to use a function that ensures that subsequent I/O requests targeting the logical storage go to the new device. Such a technique alleviates the need to replace an entire data storage system. Additionally, such a technique can be performed transparently (or seamlessly) from the perspective of host computer(s) and not consume host computer resources, network bandwidth, and so on.

Figure 1:
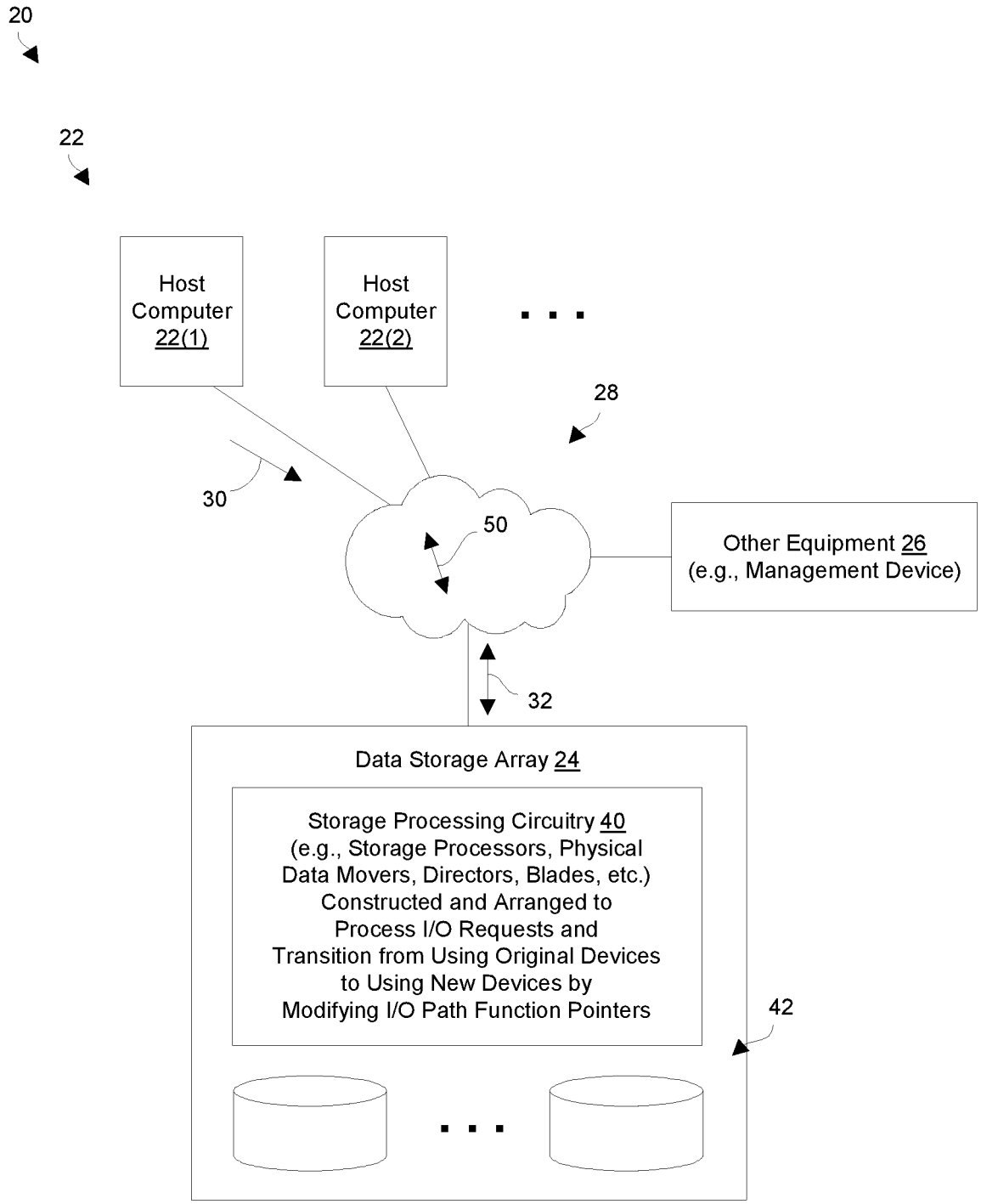
FIG. 1 is a block diagram of a data storage environment in accordance with certain embodiments.

FIG. 1 shows a data storage environment 20 having a data storage array which is capable of transitioning from an original device to a new device by changing the function pointer in an I/O path of the data storage array. The data storage environment 20 includes host computers 22(1), 22(2), . . . (collectively, host computers 22), a data storage array 24, other equipment 26, and a communications medium 26.

Each host computer 22 is constructed and arranged to perform useful work. For example, one or more of the host computers 22 may operate as a file server, a web server, an email server, an enterprise server, a database server, a transaction server, combinations thereof, etc. which provides host I/O requests 30 to the data storage array 24. In this context, the host computers 22 may provide a variety of different I/O requests 30 (e.g., file access requests, block-based access requests, combinations thereof, etc.) that direct the data storage array 24 to store host data 32 within and retrieve host data 32 from storage (e.g., primary storage or main memory, secondary storage or non-volatile memory, other equipment and/or sites, combinations thereof, etc.).

The data storage array 24 includes storage processing circuitry 40 and storage devices 42. The storage processing circuitry 40 is constructed and arranged to respond to the host I/O requests 30 from the host computers 22 by writing host data 32 into the storage devices 42 and reading host data 32 from the storage devices 42 (e.g., solid state drives, magnetic disk drives, combinations thereof, etc.). The storage processing circuitry 40 may include one or more physical storage processors or engines, data movers, director boards, blades, I/O modules, storage device controllers, switches, other hardware, combinations thereof, and so on. While processing the host I/O requests 30, the storage processing circuitry 40 is constructed and arranged to provide a variety of specialized data storage system services and features such as caching, storage tiering, deduplication, compression, encryption, mirroring, RAID protection, snapshotting, backup/archival services, replication to other data storage equipment, and so on.

As will be explained in further detail shortly, the storage processing circuitry 40 is further constructed and arranged to transition from using original storage devices 42 to using new storage devices 42 by modifying function pointers in an I/O path. Advantageously, such capability enables slower storage devices 42 to be replaced seamlessly with faster storage devices 42.

The other equipment 26 refers to other componentry of the data storage environment 20 that may be able to access the host computers 22 and/or the data storage array 24, and/or other componentry that may be accessed by the host computers 22 and/or the data storage array 24. For example, the other equipment 26 may include one or more user/client devices (e.g., a desktop, a laptop, a tablet, a smartphone, a terminal, etc.) which are able to access a host computer 22. As another example, the other equipment 26 may include a storage administrative device (e.g., a service processor) which is able to access the data storage array (or equipment) 24. As yet another example, the other equipment 26 may include other data storage circuitry (e.g., a set of replication arrays, one or more appliances, backup facilities, combinations thereof, etc.) which is able to exchange data with the data storage array 24, and so on.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the host devices 22 send host I/O requests 30 (e.g., read commands, write commands, etc.) to the data storage array 24 for processing. In response, the storage processing circuitry 40 of the data storage equipment 24 robustly and reliably performs host I/O operations such as writing host data 32 into and reading host data 32 from the storage devices 42. In particular, the host data 32 and perhaps other user data (e.g., snapshots, backups, archives, etc.) is stored within one or more of the storage devices 42. Additionally, internal metadata which is used by the data storage array 24 to support data storage operations (e.g., extent mappings, snapshot metadata, deduplication metadata, compression metadata, etc.) is stored within one or more of the storage devices 42.

At some point, it may be desirable to replace one or more storage devices 42 within the data storage array 24. To transition from using an original device 42 to using a new device 42, the data storage array 24 modifies an I/O path to logical storage which is currently supported by the original device 42 so that the I/O path uses different function pointers to different functions. Along these lines, the data storage array 24 may map high level logical addresses to other addresses leading to particular storage devices 42 (e.g., higher level logical block addresses mapped to lower level logical block addresses, logical block addresses mapped to physical block addresses, combinations thereof, and so on).

To effectuate the transition, the data storage array 24 initiates a copying activity that copies data from the original device 42 to the new device 42. During this copying activity, the data storage array 24 changes the function pointer in the I/O path in order to address a new function that clones write requests to both the original device 42 and the new device 42. Accordingly, write requests that target logical storage which is currently supported by the original device 42 are processed by both the original device 42 and the new device 42 for consistency.

After the data has been copied from the original device 42 to the new device 42, the data storage array 24 changes the function pointer in the I/O path to another new function that routes I/O requests that target the logical storage to the new device 42 rather than the original device 42. This function pointer change ensures that subsequent I/O requests targeting the logical storage now go to the new device 42.

Such operation may be controlled by a set of user commands (i.e., one or more user commands) provided to the storage processing circuitry 40. In particular, each user command may be entered directly into the data storage array 24 itself, or be sent from one or more external locations, e.g., from a host computer 22, from the other equipment 26 such as a dedicated management device, and so on. Additionally, the operator may enter a series of commands or run a routine or script to carry out the above-mentioned transitioning operations.

Such operation is well suited for replacing (or upgrading) storage devices 42. For example, an operator of the data storage array 24 may wish to use faster NVMe (Non-Volatile Memory Express) drives in place of slower SAS/SATA SSDs (Serial Attached SCSI/Serial ATA solid state drives). In such a situation, once an original device 42 and a new device 42 are installed within the data storage array 24, the transition may be performed smoothly and seamlessly in response to one or more user commands. Moreover, such transitioning may be repeated in order to replace (e.g., upgrade from) multiple storage devices 42. Further details will now be provided with reference to FIG. 2.

Figure 2:
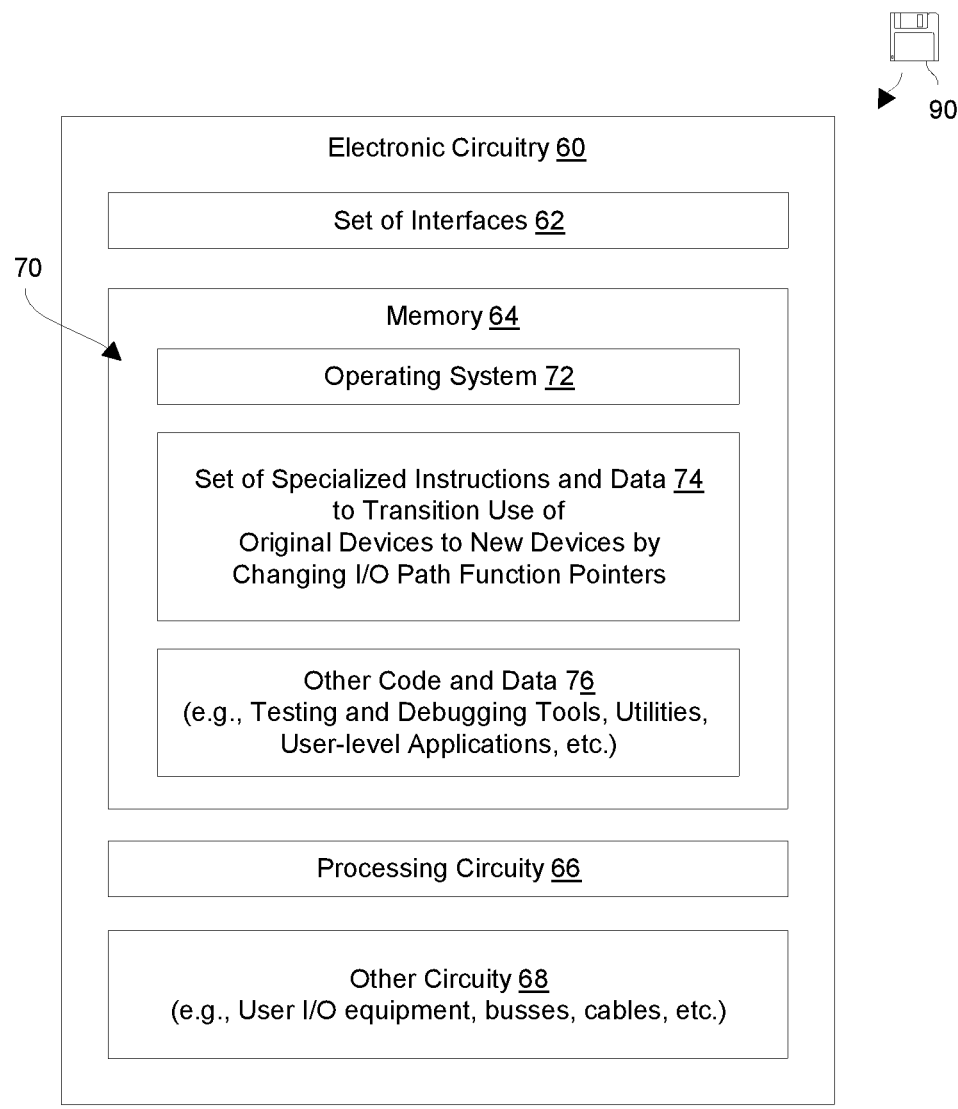
FIG. 2 is a block diagram of certain electronic circuitry of the data storage environment of FIG. 1 in accordance with certain embodiments.

FIG. 2 shows electronic circuitry 60 which is suitable for use within the data storage environment 20 (also see FIG. 1) in accordance with certain embodiments. Along these lines, all or part of the electronic circuitry 60 may form a part of the storage processing circuitry 40. Alternatively or additionally, all or part of the electronic circuitry 60 may reside at a different location within the data storage environment 20 (e.g., elsewhere within the data storage array 24, as part of the other equipment 26, etc.). As shown, the electronic circuitry 60 includes a set of interfaces 62, memory 64, and processing circuitry 66, and other componentry 68.

The set of interfaces 62 is constructed and arranged to connect the electronic circuitry 60 to other portions of the data storage environment 20 (e.g., to the communications medium 28, to the storage devices 42, to combinations thereof, etc.). Such communications may be SAN-based, IP-based, cellular-based, cable-based, fiber-optic based, wireless, cloud-based, combinations thereof, and so on. Accordingly, the set of interfaces 62 enables the electronic circuitry 60 to robustly and reliably communicate with other componentry.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized instructions and data 74, and other code and data 76. The operating system 72 refers to particular control code such as a kernel to manage computerized resources (e.g., processor cycles, memory space, etc.), drivers (e.g., an I/O stack), and so on. The specialized instructions and data 74 for transitioning from original devices 42 to new devices 42 within the data storage array 24 (e.g., by managing data copying activities, changing function pointers in the kernel's I/O path, etc.). In some arrangements, the specialized instructions and data 74 is tightly integrated with or part of the operating system 72 itself. The other code and data 76 refers to applications and routines to provide additional operations and services (e.g., performance measurement tools, etc.), user-level applications, administrative tools, utilities, and so on.

The processing circuitry 66 is constructed and arranged to operate in accordance with the various software constructs 70 stored in the memory 64. In accordance with certain embodiments, such processing circuitry 66 is suitable for forming at least a portion of the storage processing circuitry 40 (also see FIG. 1).

Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, flash memory, disk memory, tape memory, and the like.

The other componentry 68 refers to other hardware of the electronic circuitry 70. Along these lines, the electronic circuitry 70 may include special busses, cabling, adaptors, transducers, other specialized data storage componentry, etc. Further details will now be provided with reference to FIGS. 3 through 5.

Figure 3:
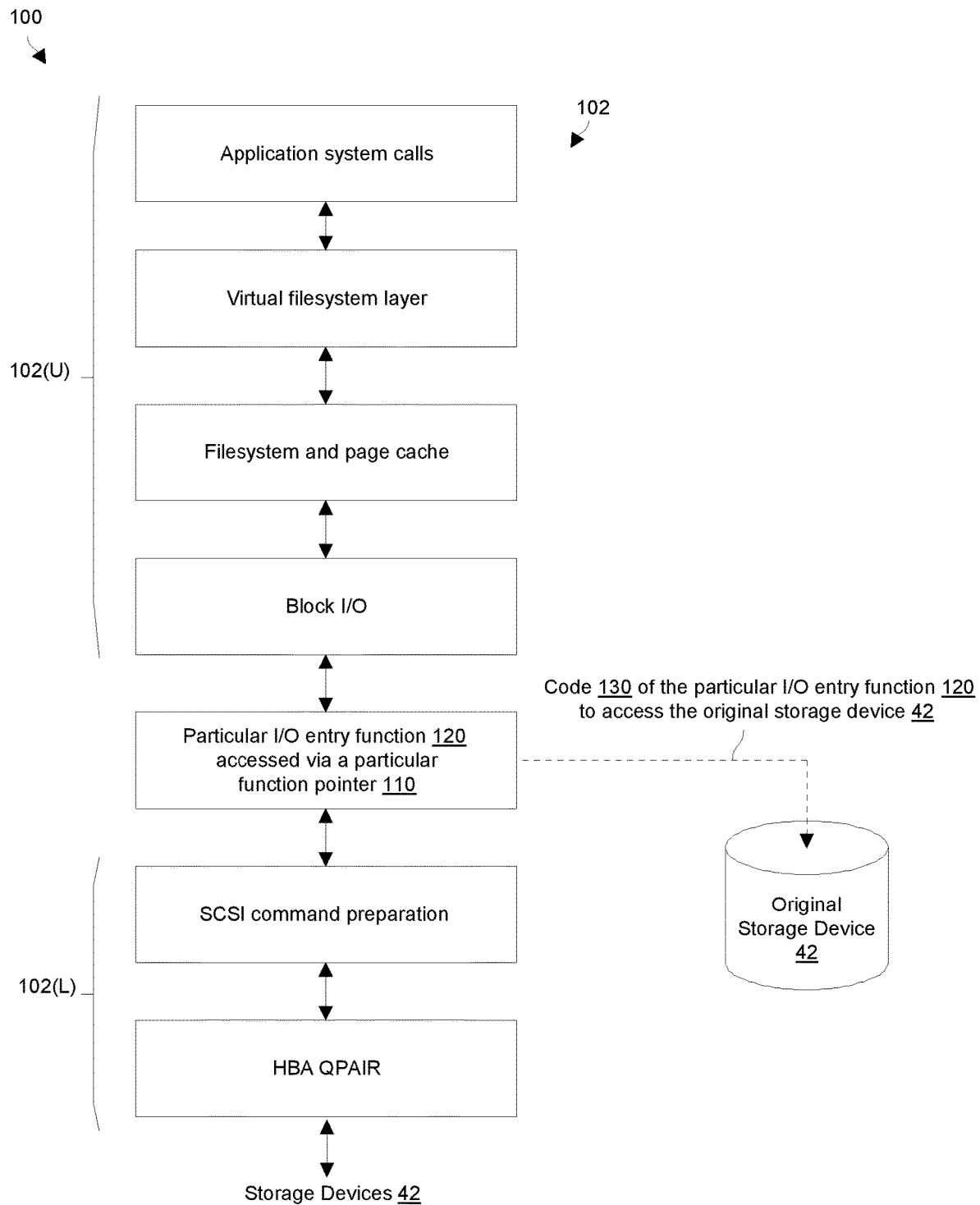
FIG. 3 is a block diagram illustrating particular details of the data storage environment in accordance with certain embodiments.
Figure 4:
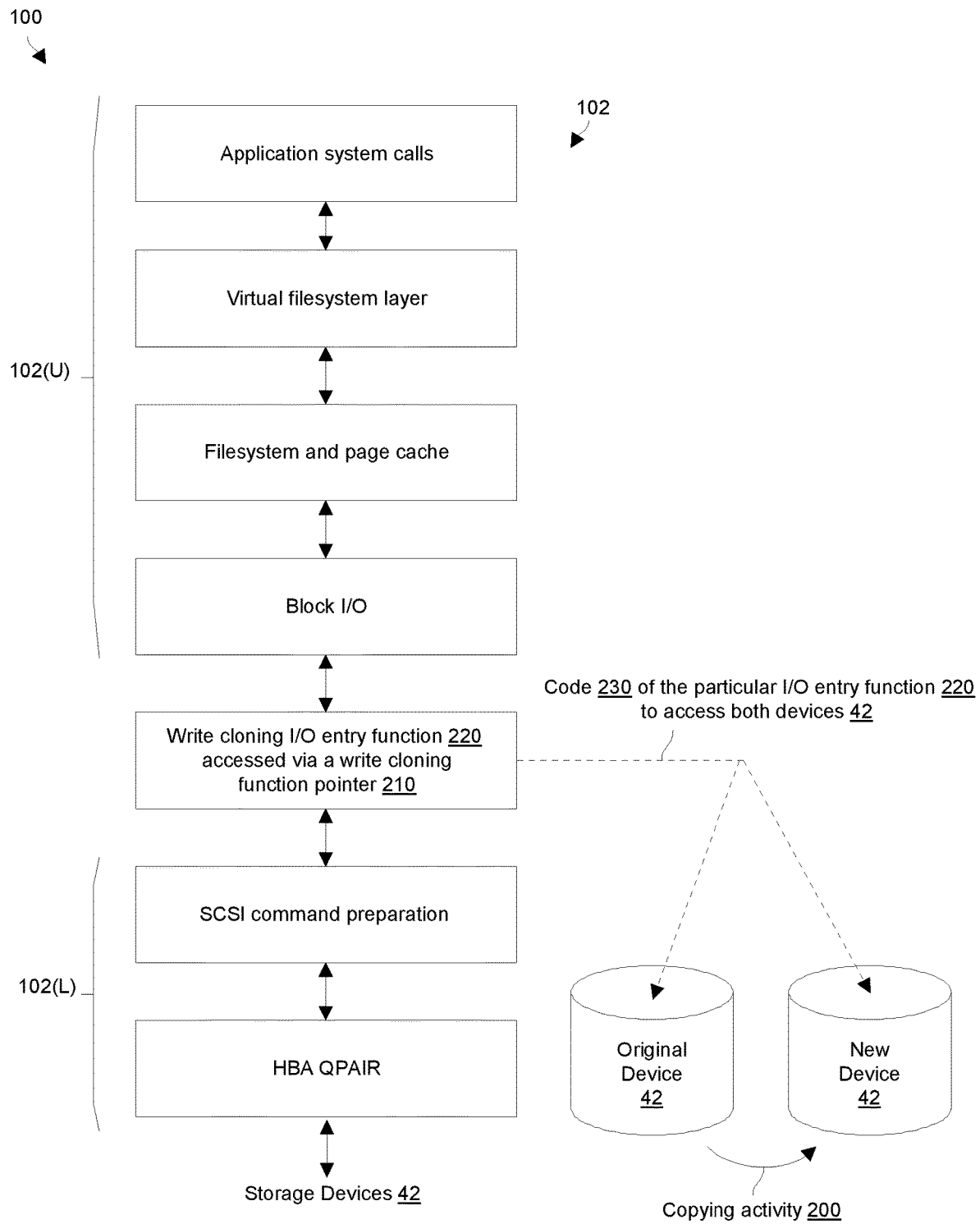
FIG. 4 is a block diagram illustrating further details of the data storage environment in accordance with certain embodiments.
Figure 5:
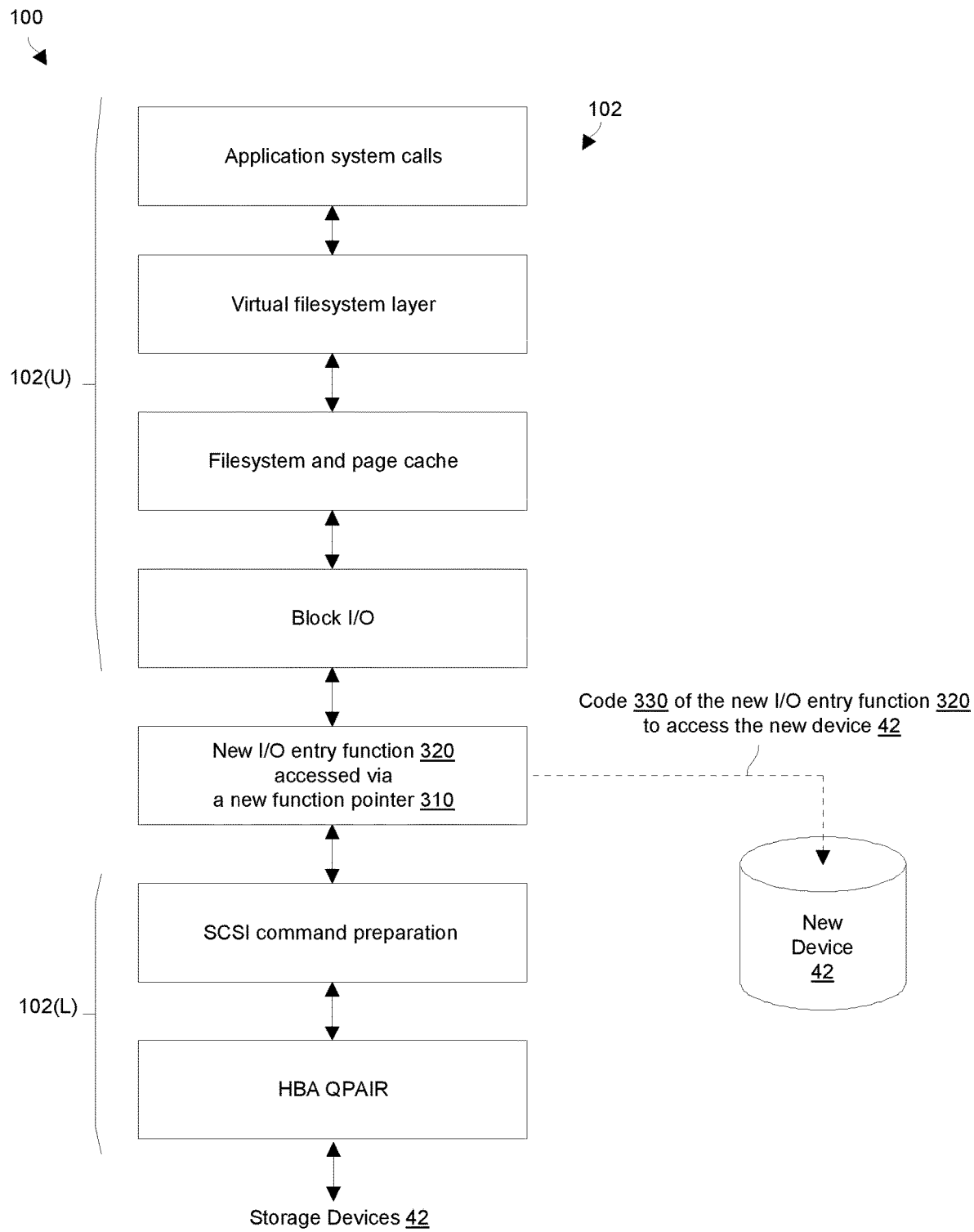
FIG. 5 is a block diagram illustrating yet further details of the data storage environment in accordance with certain embodiments.

FIGS. 3 through 5 show, by way of example, how the data storage array 24 (FIG. 1) transitions from using an original device 42 to using a new device 42 in accordance with certain embodiments. FIG. 3 shows an example kernel I/O path 100 for initially processing I/O requests to the original device 42. FIG. 4 shows the example kernel I/O path 100 after an initial function pointer is replaced with a second function pointer for write cloning. FIG. 5 shows the example kernel I/O path 100 after the second function pointer is replaced with a third function pointer for processing I/O requests to the new device 42.

First, it should be understood that the data storage array 24 may use the same I/O path to access all kinds of storage devices 42 (e.g., SSDs, HDDs, etc.). Additionally, it should be understood that the kernel's I/O path has certain function pointers that can be replaced. Furthermore, modifying these function pointers provides the ability to modify further processing of I/O requests (e.g., to change where the I/O requests are routed, to control whether particular I/O requests are cloned, to effectuate functionality tweaks, combinations thereof, and so on).

Along these lines and as shown in FIG. 3, the example kernel I/O path 100 includes a variety of kernel stages or layers 102 which are involved when processing I/O requests into I/O operations that access storage devices 42. Such I/O requests may involve writing data to storage devices 42, reading data from storage devices 42, checking the status of storage device 42, querying storage devices 42 for operating statistics or other information, and so on.

Initially, when the kernel of the data storage array 24 receives an I/O request to access the particular storage device 42, the upper stages or layers 102(U) of the example I/O path 100 determine certain aspects of the requested operation such as whether the I/O request is read request or a write request, which logical block(s) hold the data, whether the data is currently in cache, and so on. In accordance with certain embodiments and by way of example, the I/O path 100 may also be represented as expression (1) below:

$$src\_disk \rightarrow queue \rightarrow make\_request\_fn \qquad (1)$$

where "make_request_fn" is a particular function pointer 110, i.e., an entry point into a particular I/O entry function 120 that accesses the original storage device 42. The dashed line in FIG. 3 illustrates that the particular I/O entry function 120 accesses the original storage device 42 via certain code 130.

When the kernel uses the function pointer 110, the kernel is able to access the original storage device 42 among other storage devices 42 of the data storage array 24. To this end, the lower stages or layers 102(L) of the I/O path 100 are involved in ultimately accessing the original storage device 42 to perform the requested operation, e.g., in accordance with the Small Computer System Interface (SCSI) protocol and through a particular host bus adaptor, etc.

It should be understood that the stages or levels 102 of the example kernel I/O path 100 are provided by way of example only. Other kernel I/O path configurations are suitable for use as well.

Prior to transitioning from using the original device 42 to using the new device 42, the example kernel I/O path 100 initially includes a particular function pointer 110 (e.g., see "make_request_fn" in expression (1) above) that addresses a particular I/O entry function 120 in order to access the original device 42 in a normal manner (or mode). That is, the I/O entry function 120 includes code 130 for normally processing I/O requests targeting logical storage supported by the original device 42.

With reference now to FIG. 4, suppose that the original device 42 has been in operation for some time, i.e., the storage processing circuitry 40 of the data storage array 24 processes I/O requests targeting logical storage supported by the particular storage device 42 using the particular I/O entry function 120. Further suppose that the operator of the data storage array 24 now wishes to transition from using this original device 42 (e.g., a slower storage drive) to a new device 42 (e.g., a faster storage drive).

To make such a transition, the operator provides a set of commands (e.g., one or more user commands) to the data storage array 24. In response, the data storage array 24 initiates a copying activity 200 in which the storage processing circuitry 40 copies data, which currently exists on the original device 42, from the original device 42 to the new device 42. Such copying activity 200 may occur in the background so that it is transparent to any host computers 22 (also see FIG. 1).

In accordance with certain embodiments, the copying activity 200 involves copying the data between corresponding sectors of the storage devices 42. That is, the original device 42 has a first series of sectors 0 to N, the new device 42 has a second series of sectors 0 to N, and the copying activity 200 involves reading data from the first series of sectors of the original device 42 and writing the data to the second series of sectors of the new device 42 to preserve data sector locations (e.g., sequentially copying all of the sectors 0 to N).

Table 1 below shows example pseudo code for modifying the example kernel I/O path to initiate the transition from the original device 42 to the new device 42.

TABLE 1

| identify source device from user command; | /* receive name of original device */ |
| identify destination device from user command; | /* receive name of new device */ |
| initiate copy activity that copies | /* read data sequentially from sectors */ |
| data from source device to destination device; | /* of the source device and write the data */ |
| | /* to corresponding sectors of the */ |
| | /* destination device */ |

Also at this same time and in response to the set of commands, the data storage array 24 modifies the I/O path 100. In particular, a special routine replaces the particular function pointer 110 to the particular I/O entry function 120 with a second function pointer 210 to a second I/O entry function 220 which performs write cloning. Along these lines, the second I/O entry function 220 includes code 230 that clones each write request into a first write request routed to the original device 42 and a second write request routed to the new device 42. In some arrangements, this routine briefly quiesces the data storage array 24 before making the function pointer change to enable any partially performed I/O operations to complete. Accordingly, any new data that is written to logical storage originally supported by the original device 42 is written to both the original device 42 and the new device 42 for consistency. Again, such operation may be made transparent to the host computers 22.

Table 2 below shows example pseudo write cloning of I/Os (also see the code 230 in FIG. 4).

TABLE 2

| | |
|---|---|
| identify source device from user command; | /* receive name of original device */ |
| identify destination device from user command; | /* receive name of new device */ |
| src_ptr = source_entry_fn; | /* save address of original device entry function */ |
| dst_ptr = destination_entry_fn; | /* save address of new device entry function */ |
| if write_IO issued to the original device,<br>   send write_IO to src_ptr and dst_prt; | /* send write request to both the */<br>/* original device and the new device */ |

With reference now to FIG. 5, suppose that the storage processing circuitry 40 has copied all of the data from the original device 42 to the new device 42, i.e., the original device 42 and the new device 42 store the same data. At this point, the copying activity 200 is considered finished and the operator may commit to using the new device 42 in place of the original device 42.

To commit to the new device 42, the operator provides a user command to the storage processing circuitry 40 that again modifies the example kernel I/O path 100. In particular, the user command runs a routine that replaces the write cloning function pointer 210 to the write cloning I/O entry function 220 with a third function pointer 310 that addresses a third I/O entry function 320 having code 330 to access the new device 42. In some arrangements, the routine temporarily quiesces the data storage array 24 before making the function pointer change to enable any partially performed I/O operations to complete. Once the example kernel I/O path 100 has been modified to use the new function pointer 310, all new I/O requests are processed by the new device 42. Again, this operation may be made transparent to the host computers 22.

Figure 6:
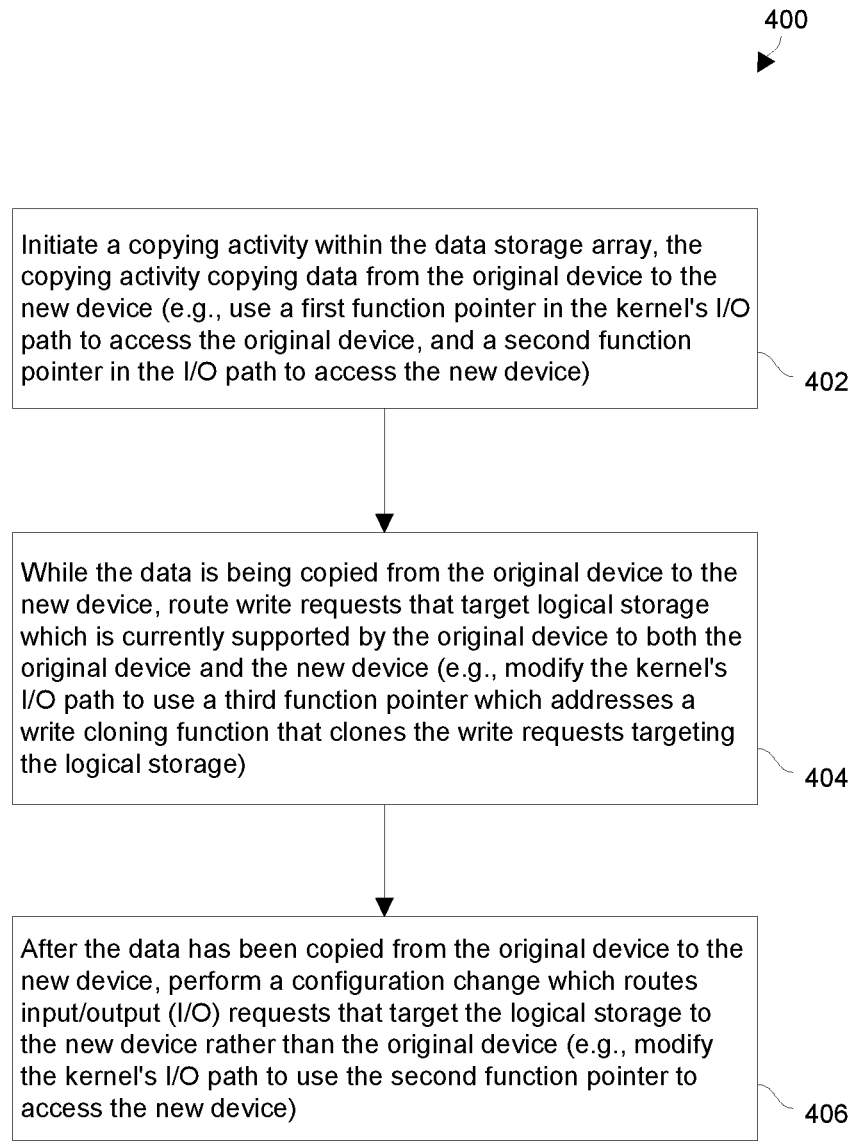
FIG. 6 is a flowchart of a procedure which is performed by the data storage environment in accordance with certain embodiments.

FIG. 6 is a flowchart of a procedure 400 for transitioning from an original device to a new device within a data storage array in accordance with certain embodiments. In particular, the procedure 400 may be performed by specialized circuitry such as that which is formed by the processing circuitry 66 running in accordance with the specialized instructions and data 74 (also see FIG. 2).

At 402, the specialized circuitry initiates a copying activity within the data storage array. The copying activity copies data from the original device to the new device (e.g., sector by sector).

At 404, while the data is being copied from the original device to the new device, the specialized circuitry routes write requests that target logical storage which is currently supported by the original device to both the original device and the new device. For example, the specialized circuitry may modify the kernel's I/O path to use a function pointer which addresses a write cloning function that clones the write requests which target the logical storage supported by the original device.

In accordance with certain embodiments, such modification of the function pointer in the I/O path may be initiated by a user command. For example, the user command may launch a special routine or script that uses IOCTL instructions, etc. to change the function pointer.

At 406, after the data has been copied from the original device to the new device, the specialized circuitry performs a configuration change which routes I/O requests that target the logical storage to the new device rather than the original device. For example, the specialized circuitry modifies the kernel's I/O path again to use another function pointer to access the new device.

It should understood that the procedure 400 may be repeated to transition from other original devices to other new devices. Moreover, such transitioning may be performed in combination with other ongoing services such as snapshotting, backups, deduplication, garbage collection, RAID protection and/or recovery, replication, combinations thereof, and so on.

As described above, improved techniques are directed to transitioning from original devices 42 to new devices 42 within data storage arrays 24 by changing function pointers in the input/output (I/O) paths 100 of the data storage arrays 24. Along these lines, some data storage arrays 24 have the ability to replace function pointers in the I/O paths 100 of the kernels. To transition from using an original device 42 (e.g., a slower storage drive) to using a new device 42 (e.g., a faster storage drive) in such a data storage array 24, the data storage array 24 starts copying data from the original device 42 to the new device 42. Additionally, while the data storage array 24 copies the data from the original device 42 to the new device 42, the I/O path 100 is modified to use different function pointers to different functions. In particular, at a first time, the function pointer in the I/O path 100 is modified to use a function that clones writes requests that target logical storage supported by the original device 42 (i.e., to clone write requests to both the original device 42 and the new device 42 for consistency). At a second time after data storage array 24 has copied all of the data from the original device 42 to the new device 42, the function pointer in the particular I/O path 100 is modified again to use a function that ensures that subsequent I/O requests targeting the logical storage go to the new device 42. Such techniques alleviate the need to replace an entire data storage system. Furthermore, such techniques can be performed in the background (e.g., transparently from host computers) rather than intrusively consume host computer resources and network bandwidth.

One should appreciate that the above-described techniques do not merely collect, analyze and store information. Rather, the disclosed techniques involve improvements to the technology. For example, with the techniques, certain advantages are available such as transitioning from using an original device to using a new device to storage data. Such transitioning may be performed seamlessly in the background without consuming host computer resources, network bandwidth, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 and/or the other equipment 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

In accordance with certain embodiments, the techniques disclosed herein enable moving/changing SAS/SATA SSD drives to NVMe drives. Along these lines, higher latency storage array drives such as SAS/SATA SSDs may be changed to lesser latency NVMe devices on the fly. Other types of devices are suitable as well.

One should appreciate that storage arrays may use the same IO path in the kernel to submit IO to all kind of drives, block devices. The kernel IO path may have certain function pointers which can be replaced. By changing these function pointers, it is possible to change the route where the IO goes, tweaks the functionality of the called function, etc. In some arrangements, there may be a seamless change of one drive, block device to another block device.

To this end and in accordance with certain embodiments, a source drive is selected, and destination faster device is attached to the storage array. A new IOCTL is sent to the kernel to change the function pointer in IO path of source device in such a way that the write cloning is done to the destination device. Also, after this, a background copy is initiated from the source drive to the destination device. Once the background copy is finished, an IOCTL is sent to change the function pointer, this new function does the work of routing all the IOs to the faster destination device.

The techniques disclosed herein enable transitioning from slower devices to faster NVMe devices or replacing older NVMe devices with newer NVMe devices. Other types of devices may be used as well.

One should further appreciate that storage drive technology changes from time to time. In particular, older drives become slow and newer drives provide less latency because of newer access technology. In conventional systems, there is no way to seamlessly replace slow devices with faster devices. That is, arrays keep providing the same latency and there is no way to change the drives.

Furthermore, some storage devices are kept in tiers. For example, tier0 may have the fastest devices with least latency, and lower tiers may have slower devices. Unfortunately, in conventional storage arrays, there is no way to replace the tier0 devices with faster devices. Also, the next tiers may not be replaceable even if access technology provides better access times.

However, as disclosed herein, certain improved techniques enable changing function pointers in the I/O path of source device. In particular, the function pointer in the I/O path changes at a first time to enable write cloning. The function pointer then changes at a second time to ensure subsequent I/O requests go to the new destination device. Also as part of the transition, background copying is done from sector 0 to N of the source device to sector 0 to N of the destination device.

After these steps are done, the slower source device can be removed. For example, SATA/SAS/NVME devices can be replaced with NVMe devices. This can be repeated for all devices which belong to various storage tiers, seamlessly.

In accordance with certain embodiments, the following are the steps which describe a solution:

A user selects the source device to be removed and selects a destination device. At the start of steps these device names are passed to a kernel module. The kernel module starts two activities in parallel:

Activity 1. Copy of data from the source device to the destination device. This activity involves sequentially reading data from the source device starting from the first sector and writing it to the first sector of the destination device. This activity continues copying all the sectors one by one from the source device to the destination device.

Activity 2. Clone write IOs. If any write IOs come to (or target) logical storage supported by the source device, these write IOs are also written to both the source device and the destination device. Once all of the sectors are copied from the source device to the destination device, the user can commit the transition, e.g., use the new configuration permanently. In particular, on receiving a commit request from user, the kernel module starts routing all subsequent IOs to the destination device.

Steps used by kernel module for copy of data may involve the following:

A) User passes the names of the source and destination devices to the kernel module.

B) The kernel module starts reading data sequentially from the source device and writing it to the destination device.

Steps used by kernel module for write cloning IOs involve the following:

A) User provides the names source and destination devices to the kernel module.

B) The kernel module identifies the IO entry functions of the source and destination devices.

C) The kernel module saves the address of the source device IO entry function (e.g., "old_source_io_entry_fn").

D) The kernel module saves the address of the destination device IO entry function (e.g., "dest_io_entry_fn").

E) The kernel module replaces the source device's IO entry function with a new one (e.g., "in_movement_source_io_entry_fn").

F) The kernel module write IOs are issued to the source device so the new IO entry function (e.g., "in_movement_source_io_entry_fn") will send the writes to the destination device, through "dest_io_entry_fn".

G) The new IO entry function (e.g., "in_movement_source_io_entry_fn") then calls source device IO entry function (e.g., "old_source_io_entry_fn"). This will send all the IOs to the source device as well.

It should be understood that both write IO forwarding (cloning), and copying of data are done in parallel. This ensures that source and destination devices are consistent at any point of time.

By way of example and in accordance with certain embodiments, the improved techniques may involve using the Linux operating system. In particular, certain aspects can be achieved by changing the request_queue→make_request_fn from time to time 1. //Save the make request_fn of the source and dest dev
    src_old_make_request_fn=src_disk→queue→make_request_fn;
    dest_make_request_fn=dest_disk→queue→make_request_fn;

2. //Change the make request_fn of the source dev
    src_disk→queue→make_request_fn=src_new_make_request_fn;

```
3. // Implementation of src_new_make_request_fn
static          blk_qc_t_src_new_make_request_fn(struct
request_queue *q, struct bio *src_bio)
{
  if (op_is_write(bio_op(src_bio)))
  {
  Submit bio to destination
  }
  // Call the old request function
final_ret=src_old_make_request_fn(q, src_bio);
}
4. After the background copy is done:
//change the make request fn as post path flip req function
src_disk→queue→make_request_fn=src_post_flip_make_
request_fn;
5. Implementation of src_post_flip_make_request_fn
static    blk_qc_t    src_post_flip_make_request_fn(struct
request_queue *src_q, struct bio *src_bio)
{
 . . . .
    ret=dest_make_request_fn(dest_queue, src_bio);
 . . . .
}
```

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, the storage devices 42 may be co-located with the storage processing circuitry 40. Alternatively, the storage devices 42 reside in a separate location (e.g., a separate storage device assembly/enclosure/array).

Additionally, the data storage equipment 24 may take a variety of topologies. In some arrangements, all of the data storage equipment 24 resides in a single location (e.g., a single cabinet, lab, room, floor, building, campus, etc.). In other arrangements, the data storage equipment 24 includes components that are distributed among multiple locations (e.g., different corners of a room, floors, buildings, campuses, towns, states, coasts, countries, etc.).

Furthermore, the data storage equipment 24 make take a variety of different forms such as one or more disk array enclosures, rack mount equipment, electronic cabinets, data storage arrays, and/or assemblies, distributed equipment, combinations thereof, and so on. Moreover, the data storage equipment 24 is capable of performing different data storage operations, e.g., file-based operations, block-based operations, combinations thereof, etc. Such modifications and enhancements are intended to belong to various embodiments of the disclosure.

What is claimed is:

1. A method of transitioning from an original device to a new device within a data storage array, the method comprising:
   initiating a copying activity within the data storage array, the copying activity copying data from the original device to the new device;
   while the data is being copied from the original device to the new device, routing write requests that target logical storage which is currently supported by the original device to both the original device and the new device; and
   after the data has been copied from the original device to the new device, performing a configuration change which routes input/output (I/O) requests that target the logical storage to the new device rather than the original device.

2. The method as in claim 1 wherein the data storage array uses different I/O entry functions to access different storage devices;
   wherein the method further comprises:
      prior to initiating the copying activity, processing I/O requests targeting the logical storage using a first I/O entry function that accesses the original device, and
      after the configuration change is performed, processing I/O requests targeting the logical storage using a second I/O entry function that accesses the new device rather than the first I/O entry function that accesses the original device.

3. The method as in claim 2 wherein the data storage array executes a kernel which addresses the first I/O entry function via a first function pointer and addresses the second I/O entry function via a second function pointer;
   wherein the kernel manages access to the logical storage via an I/O path which initially includes the first function pointer when processing I/O requests targeting the logical storage using the first I/O entry function; and
   wherein performing the configuration change includes:
      modifying the I/O path to use the second function pointer in place of the first function pointer, the kernel processing I/O requests targeting the logical storage using the second I/O entry function in response to modifying the I/O path to use the second function pointer.

4. The method as in claim 3 wherein at least some of the write requests originate from a set of hosts; and
   wherein the copying activity and the configuration change are performed transparently from the perspective of the set of hosts.

5. The method as in claim 2 wherein initiating the copying activity within the data storage array includes:
   receiving a user command to transition from the original device to the new device, and
   in response to the user command, reading the data from the original device and writing the data to the new device.

6. The method as in claim 5 wherein receiving the user command includes:
   obtaining, as a transition command, an IOCTL system call which includes:
   (i) a first identifier which identifies, as the storage device to transition from, the original device, and
   (ii) a second identifier which identifies, as the storage device to transition to, the new device, and
   wherein starting the background copy operation includes the method further comprises:
      in response to the IOCTL system call, starting a background copy operation that reads the data from the original device and writes the data to the new device, the background copy operation being transparent to a set of hosts that access the logical storage.

7. The method as in claim 5 wherein the original device has a first series of sectors;
   wherein the new device has a second series of sectors which matches the first series of sectors; and wherein reading the data from the original device and writing the data to the new device includes:
sequentially reading data from the first series of sectors of the original device and writing the data to the second series of sectors of the new device to preserve data sector locations.

8. The method as in claim 2 wherein routing write requests that target logical storage which is currently supported by the original device to both the original device and the new device includes:
processing I/O requests using a third I/O entry function that accesses both the original device and the new device, the third I/O entry function being different from the first I/O entry function and the second I/O entry function.

9. The method as in claim 8 wherein the data storage array executes a kernel which addresses the first I/O entry function via a first function pointer, addresses the second I/O entry function via a second function pointer, and addresses the third I/O entry function via a third function pointer;
wherein the kernel manages access to the logical storage via an I/O path which initially includes the first function pointer when processing I/O requests targeting the logical storage using the first I/O entry function; and
wherein routing write requests that target logical storage which is currently supported by the original device to both the original device and the new device further includes:
prior to processing I/O requests using the third I/O entry function, modifying the I/O path to use the third function pointer in place of the first function pointer, the kernel processing I/O requests targeting the logical storage using the third I/O entry function in response to modifying the I/O path to use the third function pointer.

10. The method as in claim 9 wherein processing I/O requests using the third I/O entry function includes:
cloning write operations targeting the logical storage to both the original device and the new device.

11. The method as in claim 2 wherein the original device is a SAS/SATA SSD (Serial Attached SCSI/Serial ATA solid state drive);
wherein processing I/O requests targeting the logical storage using the first I/O entry function that accesses the original device includes:
performing I/O operations on the SAS/SATA SSD in accordance with a Serial Attached SCSI/Serial ATA Solid State protocol;
wherein the new device is a NVMe (Non-Volatile Memory Express) drive; and
wherein processing I/O requests targeting the logical storage using the second I/O entry function that accesses the new device includes:
performing I/O operations on the NVMe drive in accordance with a Non-Volatile Memory Express protocol.

12. The method as in claim 11, further comprising:
prior to initiating the copying activity, adding the NVMe drive to the data storage array while I/O operations are performed on the SAS/SATA SSD.

13. A data storage array, comprising:
a set of interfaces;
memory; and
control circuitry coupled to the set of interfaces and the memory, the memory storing instructions which, when carried out by the control circuitry, cause the control circuitry to:
initiate a copying activity within the data storage array, the copying activity copying data from an original device to a new device,
while the data is being copied from the original device to the new device, route write requests received through the set of interfaces that target logical storage which is currently supported by the original device to both the original device and the new device, and
after the data has been copied from the original device to the new device, perform a configuration change which routes input/output (I/O) requests received through the set of interfaces that target the logical storage to the new device rather than the original device.

14. The data storage array as in claim 13 wherein the data storage array uses different I/O entry functions to access different storage devices;
wherein the control circuitry is constructed and arranged to:
prior to initiating the copying activity, process I/O requests targeting the logical storage using a first I/O entry function that accesses the original device, and
after the configuration change is performed, process I/O requests targeting the logical storage using a second I/O entry function that accesses the new device rather than the first I/O entry function that accesses the original device.

15. The data storage array as in claim 14 wherein the data storage array executes a kernel which addresses the first I/O entry function via a first function pointer and addresses the second I/O entry function via a second function pointer;
wherein the kernel manages access to the logical storage via an I/O path which initially includes the first function pointer when processing I/O requests targeting the logical storage using the first I/O entry function; and
wherein the control circuitry, when performing the configuration change, is constructed and arranged to:
modify the I/O path to use the second function pointer in place of the first function pointer, the kernel processing I/O requests targeting the logical storage using the second I/O entry function in response to modifying the I/O path to use the second function pointer.

16. The data storage array as in claim 15 wherein the control circuitry, when initiating the copying activity within the data storage array, is constructed and arranged to:
receive a user command to transition from the original device to the new device, and
in response to the user command, read the data from the original device and writing the data to the new device.

17. The data storage array as in claim 16 wherein the control circuitry, when routing write requests that target logical storage which is currently supported by the original device to both the original device and the new device, is constructed and arranged to:
process I/O requests using a third I/O entry function that accesses both the original device and the new device, the third I/O entry function being different from the first I/O entry function and the second I/O entry function.

18. The data storage array as in claim 17 wherein the original device is a SAS/SATA SSD (Serial Attached SCSI/Serial ATA solid state drive);
wherein the control circuitry, when processing I/O requests targeting the logical storage using the first I/O entry function that accesses the original device, is constructed and arranged to:
  perform I/O operations on the SAS/SATA SSD in accordance with a Serial Attached SCSI/Serial ATA Solid State protocol;
wherein the new device is a NVMe (Non-Volatile Memory Express) drive; and
wherein the control circuitry, when processing I/O requests targeting the logical storage using the second I/O entry function that accesses the new device, is constructed and arranged to:
  perform I/O operations on the NVMe drive in accordance with a Non-Volatile Memory Express protocol.

19. A computer program product having a non-transitory computer readable medium which stores a set of instructions to transition from an original device to a new device within a data storage array; the set of instructions, when carried out by computerized circuitry, causing the computerized circuitry to perform a method of:
  initiating a copying activity within the data storage array, the copying activity copying data from the original device to the new device;
  while the data is being copied from the original device to the new device, routing write requests that target logical storage which is currently supported by the original device to both the original device and the new device; and
  after the data has been copied from the original device to the new device, performing a configuration change which routes input/output (I/O) requests that target the logical storage to the new device rather than the original device.

20. The computer program product as in claim 19 wherein the data storage array uses different I/O entry functions to access different storage devices;
  wherein the method further comprises:
    prior to initiating the copying activity, processing I/O requests targeting the logical storage using a first I/O entry function that accesses the original device, and
    after the configuration change is performed, processing I/O requests targeting the logical storage using a second I/O entry function that accesses the new device rather than the first I/O entry function that accesses the original device.

* * * * *